US009182878B2

(12) United States Patent
Newman et al.

(10) Patent No.: US 9,182,878 B2
(45) Date of Patent: Nov. 10, 2015

(54) TOUCH-SENSITIVE SURFACE DATA

(75) Inventors: Andrew Newman, Blackburn (GB);
Pierre Burghgraeve, Blackburn (GB)

(73) Assignee: Promethean Limited (GB)

( * ) Notice: Subject to any disclaimer, the term of this patent is extended or adjusted under 35 U.S.C. 154(b) by 113 days.

(21) Appl. No.: 13/288,601

(22) Filed: Nov. 3, 2011

(65) Prior Publication Data

US 2012/0139854 A1 Jun. 7, 2012

(30) Foreign Application Priority Data

Nov. 5, 2010 (GB) .................................. 1018771.4

(51) Int. Cl.
*G06F 3/0481* (2013.01)
(52) U.S. Cl.
CPC .................................. *G06F 3/0481* (2013.01)
(58) Field of Classification Search
None
See application file for complete search history.

(56) References Cited

U.S. PATENT DOCUMENTS

| 6,928,619 | B2 | 8/2005 | Clowe et al. | |
|---|---|---|---|---|
| 2003/0210270 | A1* | 11/2003 | Clow et al. | 345/767 |
| 2005/0125741 | A1* | 6/2005 | Clow et al. | 715/794 |
| 2007/0226636 | A1* | 9/2007 | Carpenter et al. | 715/751 |
| 2010/0083186 | A1* | 4/2010 | Zaman et al. | 715/856 |
| 2010/0283747 | A1* | 11/2010 | Kukulski | 345/173 |

FOREIGN PATENT DOCUMENTS

| WO | WO 2010/148306 | 12/2010 |
|---|---|---|
| WO | WO 2010148306 A1 * | 12/2010 |

OTHER PUBLICATIONS

Ang et al. "Sharedmind: A Tool for Collaborative Mind-Mapping." IEEE International Conference on Multimedia and Expo 2010. Jul. 19-23, 2003. pp. 1154-1155.
Brown, "Review: The Online Mind Map Smackdown." Jul. 2, 2007; downloaded from www.tiffanybbrown.com/2007/07/02/online-mind-map-services/, 6 pages.
Lin, "Cooperative Mind Map and Its Application in Meaningful Learning for Junior High School Students." IEEE International Symposium on IT in Medicine & Education, Aug. 14-16, 2009, pp. 832-835.
"Mindjet Connect Quick-Start Guide" 2008, obtained from www.mindjet.com/pdf/us/quickStartGuide_MindjetConnect_en.pdf, (especially pp. 26 to 30), 56 pages.
Search Report prepared by the United Kingdom Patent Office dated Mar. 3, 2011, for Application No. GB1018770.6, 3 pages.

(Continued)

*Primary Examiner* — Michael Faragalla
(74) *Attorney, Agent, or Firm* — Brient Globerman, LLC

(57) ABSTRACT

A method for processing data received from at least one input device associated with a computer, the method comprising: determining if received data is associated with a location-aware event, and in dependence on said data being associated with a non-location-aware event, forwarding the data to be processed by an operating system of the computer; and in dependence on said data being associated with a location-aware event, forwarding the data to be processed by an application running on the computer; on receipt of the data at the application, determining if the event is coincident with the location of a displayed window associated with the application, and in dependence on the event not being coincident with the application window, transmitting the data for delivery to the operating system; and in dependence on the event being coincident with the application window, processing the data at the application.

17 Claims, 3 Drawing Sheets

(56) References Cited

OTHER PUBLICATIONS

Search Report for European Patent Application No. EP11187941.7, dated Jun. 18, 2012, 6 pages.

Search Report prepared by the United Kingdom Patent Office on Mar. 3, 2011, for Application No. GB1018770.6.

Lin, Z. "Cooperative Mind Map and Its Application in Meaningful Learning for Junior High School Students." IEEE International Symposium on IT in Medicine & Education. Aug. 14-16, 2009. pp. 832-835.

"Mindjet Connect Quick-Start Guide" obtained from www.mindjet.com/pdf/us/quickStartGuide_MindjetConnect_en.pdf especially pp. 26 to 30.

Ang, S. et al. "Sharedmind: A Tool for Collaborative Mind-Mapping." IEEE International Conference on Multimedia and Expo 2010. Jul. 19-23, 2003. pp. 1154-1155.

Brown, T. B. "Review: The Online Mind Map Smackdown." Jul. 2, 2007; downloaded from http://tiffanybbrown.com/2007/07/02/online-mind-map-services/.

* cited by examiner

TOUCH-SENSITIVE SURFACE DATA

BACKGROUND TO THE INVENTION

1. Field of the Invention

The invention is concerned with the processing of location-aware events in a computer system running under the control of an operating system, and further running one or more applications. The invention is particularly but not exclusively concerned with the processing of location-aware events detected at a touch-sensitive surface associated with the computer system, and an application running on the computer system for handling location-aware events detected at the touch-sensitive surface.

2. Description of the Related Art

It is known generally in the art of computer systems to provide for the processing of location-aware events. A location-aware event is an event associated with a position on a display associated with the computer system, such position typically being an x,y coordinate. Typically, in prior art computer systems, a location-aware event is associated with a cursor event, the cursor being controlled by a mouse input for example.

It is also known in the art to provide computer systems with touch-sensitive display surfaces. Events associated with inputs detected at the touch-sensitive display surface are inherently location-aware events.

In certain computer systems in which touch-sensitive display surfaces are provided, it is desirable for inputs detected by the touch-sensitive display to be processed differently to other inputs, such as mouse inputs. For this reason, an operating system may be provided, running on the computer system, which is "touch-aware". A "touch-aware" operating system supports touch, and allows touch inputs detected on the touch-sensitive display surface to be identified as touch inputs and processed separately to other inputs such as mouse inputs. This can be advantageous. For example an application running on the computer system may be specific to touch inputs, and touch data may be routed directly to such an application rather than being routed via the operating system.

With such a "touch-aware" operating system, touch events can be processed differently to other input data. However such an operating system may have disadvantages by being inflexible in always directing touch events to an application. In certain scenarios, this may not be desirable.

However a touch-sensitive display surface may also be provided in a computer system which does not have a "touch-aware" capability with its operating system. In such a system, input data from the touch-sensitive display surface cannot be identified as touch data, and is identified and processed as mouse data. This means that data received at the touch-sensitive display surface cannot be identified as such, and cannot be routed directly to a touch-specific application. It is possible to ensure that touch data is directed to a touch-specific application in such an environment, by simply directing all input data to the application. However this then results in data which needs to be processed by the operating system being sent to the application. Thus the choice in such an environment is to direct all input data to the operating system, or direct all input data to the application.

With such a non-touch-aware operating system, there is no flexibility to process touch events differently to other input data, such that advantages offered by touch-aware operating systems, when a touch-sensitive display surface is provided, cannot be achieved.

It is an aim of the present invention to provide an improvement in the processing of input data in a computer system incorporating a touch-sensitive display surface.

SUMMARY OF THE INVENTION

There is provided a method for processing data received from at least one input device associated with a computer, the method comprising: determining if received data is associated with a location-aware event, and: in dependence on said data being associated with a non-location-aware event, forwarding the data to be processed by an operating system of the computer; and in dependence on said data being associated with a location-aware event, forwarding the data to be processed by an application running on the computer; on receipt of the data, at the application, determining if the event is coincident with the location of a displayed window associated with the application, and: in dependence on the event not being coincident with the application window, transmitting the data for delivery to the operating system; and in dependence on the event being coincident with the application window, processing the data at the application.

The step of processing the data at the application in dependence on the event being coincident with the application may further comprise determining if the category of event is associated with the operating system, and if so forwarding the data for processing by the operating system.

The step of processing the data at the application in dependence on the event being coincident with the application may further comprise determining if the category of event is not associated with the operating system, and if so performing the event at the application.

The application may receive location-aware events on a processing thread independent of a processing thread for performing events.

A location-aware event preferably comprises input data including a position coordinate.

The method may further comprise the step of determining if received data is to be processed by the operating system, wherein the step of determining if received data is associated with a location-aware event is performed only on data which is not to be processed by the operating system.

The determination may be made independent of whether the data is associated with a location-aware event.

The data received from at least one input device may include touch data.

There is further provided a computer program for performing, when executed on a computer, any of the method steps defined hereinabove.

The invention further provides a computer program product, for storing computer program code which when run on a computer performs any of the above-stated methods.

The invention further provides a computer system for processing data received from at least one input device comprising: an event location module for determining if received data is associated with a location-aware event, and in dependence on said data being associated with a non-location-aware event, adapted to forward the data to be processed by an operating system of the computer; and in dependence on said data being associated with a location-aware event, adapted to forward the data to be processed by an application running on the computer; an application window detection module adapted to determine if the event is coincident with the location of a displayed window associated with the application, and adapted, in dependence on the event not being coincident with the application window, to transmit the data for delivery to the operating system; and further adapted in dependence on the event being coincident with the application window, for processing the data at the application.

The computer system may further comprise an application process decision module, for determining if the category of event is associated with the operating system, and further adapted in the event of such condition to forward the data for processing by the operating system.

The application process decision module may further be adapted to determine if the category of event is not associated with the operating system, and further adapted such that the application performs the event if such condition is satisfied.

A pre-processing module may be adapted to determine if received data is to be processed by the operating system, wherein the event location module is arranged to receive only data which is not determined to be processed by the operating system.

The at least one input device may include a touch sensitive surface, such as a touch sensitive display surface.

BRIEF DESCRIPTION OF THE FIGURES

The invention will now be described by way of example with reference to the accompanying figures, in which.

DESCRIPTION OF THE PREFERRED EMBODIMENTS

The invention is described with reference to preferred arrangements and embodiments. The scope of the invention is not limited to details of any specific arrangement or embodiment described herein, and details of different arrangements and embodiments may be interchangeable.

The invention is described herein with reference to an exemplary system including a touch sensitive display surface, in which system the invention can offer particular benefits. However the invention is not limited in its applicability to systems including touch sensitive surfaces, or the processing of touch data. In general the invention relates to the processing of location-aware data/events, whether the data/events originate from a touch surface or not. Thus the examples described herein referring to a touch sensitive surface and/or touch data must not be considered as limiting the scope of the invention.

In particular the invention is described herein with reference to an example of an operating system running on a computer system, which operating system does not support touch-sensitive display surfaces, i.e. which is not "touch-aware". However the invention is not limited to such an operating system environment, and may be also utilised in an operating system environment which does support touch-sensitive display surfaces, i.e. which is "touch-aware".

In the following description reference is made to "location-aware events". A location-aware event is an event which is associated with the position on the display space of the display of the computer system. The position may be an x,y coordinate of the display. An event is data received at the computer system from an input device, such as a touch-sensitive display surface, a mouse device, or a keyboard device etc.

Figure 1:
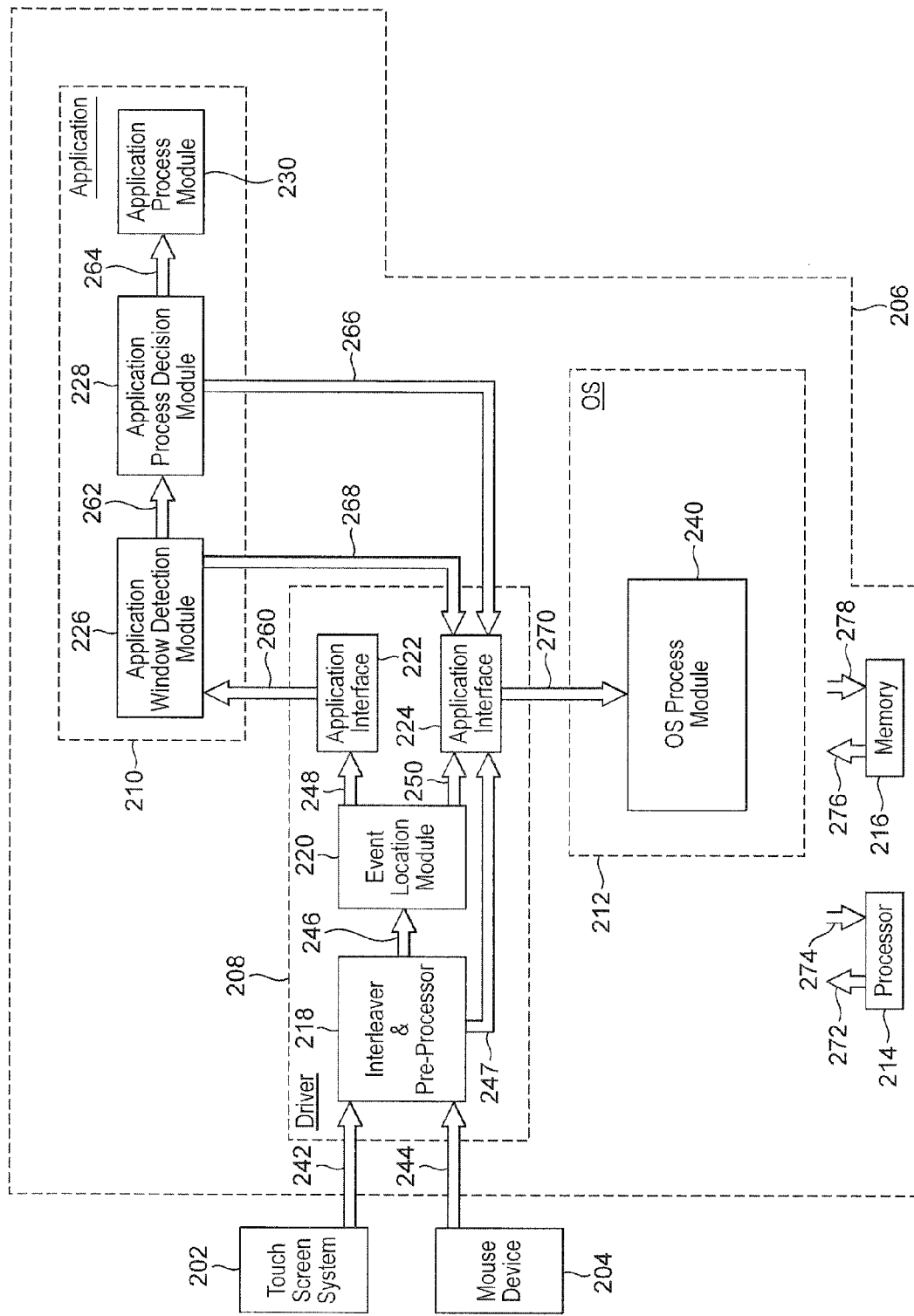
FIG. 1 illustrates a computer system adapted in accordance with a preferred embodiment of the invention.
Figure 2:
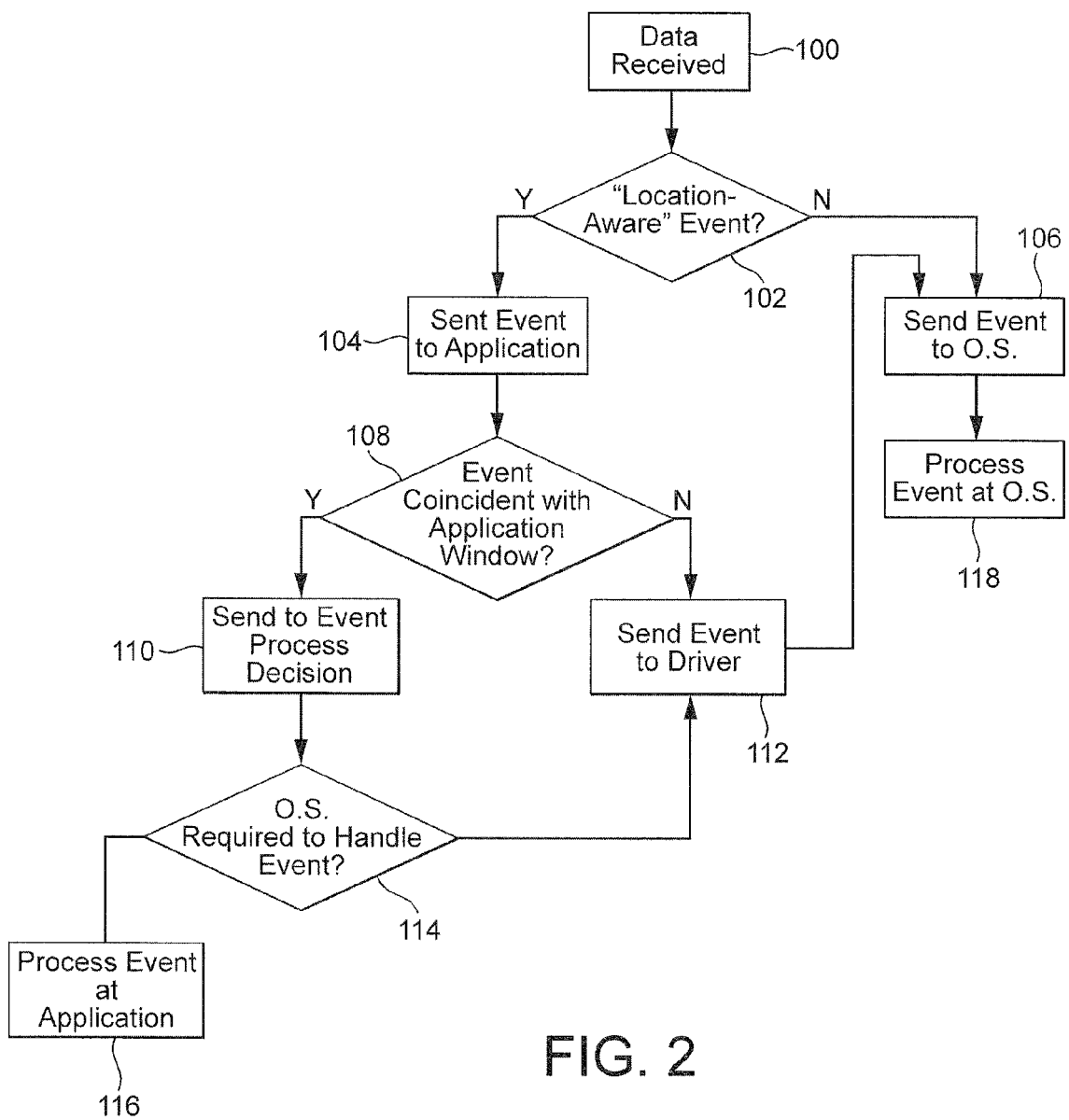
FIG. 2 illustrates a process flow in accordance with a preferred embodiment of the invention.

With reference to FIGS. 1 and 2, an embodiment of the invention is now described. As discussed hereinabove, the embodiment is described on the assumption of a computer system having an operating system which is not "touch-aware".

With reference to FIG. 1, a computer system 206 is connected to receive inputs from a touch screen system 202 on communication lines 242. In addition, the computer system 206 may be arranged to receive inputs from other external devices, such as from a mouse device 204 on communication lines 244. One skilled in the art will appreciate that inputs may be provided from additional devices, and there may be additional devices of the same type.

In FIG. 1 there is illustrated the main functional elements of the computer system 206 for implementing an embodiment of the invention. One skilled in the art will appreciate that additional functional elements are required in order to fully implement the computer system, and only the function elements which are necessary for understanding the operation of an embodiment of the invention are illustrated in FIG. 1.

As illustrated in FIG. 1, the computer system 206 includes a driver module 208, an application module 210, and an operating system (OS) module 212.

As further illustrated in FIG. 1, the computer system 206 includes a processor 214 and a memory 216. The processor 214 generates signals on communication lines 272, and receives signals on communication lines 274. The memory 216 generates signals on communication lines 276, and receives signals on communication lines 278. The processor 214 and memory 216 are in communication with various functional elements of the computer system 206, including the elements as illustrated in FIG. 1, in order to control the operation of the computer system under software control. The interconnection of the processor 214 and memory 216 with other functional elements is not illustrated in FIG. 1 for clarity reasons.

As illustrated in FIG. 1, the driver 208 includes an interleaver and pre-processor block 218, an event location module 220, an application interface 222, and an OS (operating system) interface 224. The interleaver 218 is adapted to receive inputs from the touch screen system 202 on communication lines 242, and inputs from the mouse device 204 on communication lines 244.

The pre-processing functionality of the interleaver and processor block 218 falls outside the scope of the present invention, but is briefly discussed. Although the operating system, in the described arrangement is not touch-aware, the driver 208 is able to identify the characteristics of all data received at its inputs. Thus the driver 208 can distinguish between the touch data on lines 242 and the mouse data 204. The driver is customised, according to the implementation, to process all received data to achieve the objectives of the implementation. The pre-processing functionality of the interleaver and pre-processor 218 may include some processing of the data to determine how data is processed. This may include directing some data on communication lines 247 directly to the OS interface 224, for delivery to the OS (as will be discussed further hereinbelow). Thus there is in effect a hierarchy of processing in the driver 208, and at the highest level an initial determination is made as to whether data is to be directed to the OS or not. This level of processing falls outside the scope of the invention. However this pre-processing involves a determination as to whether to send data to the OS or the application, independent of any consideration as to whether the data is associated with a location-aware event.

The interleaver 218 outputs the received data, which is not delivered to the OS on communication lines 247, on communication lines 246 to the event location module 220. Thus the data on communication lines 246 is data determined by the high-level pre-processing to be directed to the application.

As will be described further hereinbelow, the event location module 220 selectively provides data on communication lines 248 to the application interface 222, and provides data on communication lines 250 to the OS interface 224.

The application module 210 includes an application window detection module 226, an application process decision module 228, and an application process module 230. The application window detection module 226 receives signals on communication lines 260 from the application interface 222, and generates output signals on communication lines 262 to the application process decision module 228. The application process decision module 228 generates output signals on communication lines 266 to the OS interface 224, and generates output signals on communication lines 264 to the application process module 230. The application window detection module 226 additionally generates outputs on communication lines 260 to the OS interface 224.

The OS module 212 includes an OS process module 240. The OS process module receives signals on communication lines 270 from the OS interface 224.

The interleaver 218 of the driver 208 of the computer system 206 receives data on communication lines 242 and 244 (as well as data from other possible sources), and interleaves such data. The pre-processing functionality, if implemented, then filters data for presentation to the OS on communication lines 247 or for presentation to the application on communication lines, independent of any consideration as to whether the data is associated with a location-aware event. Thus some data associated with location-aware events may be sent direct to the OS on lines 247.

With reference to the flow process of FIG. 2, in a step 100 data is received at the event location module 220 on communication lines 246. All this data is, in the described prior art, directed toward the application.

However in accordance with the invention, in a step 102 a decision is made as to whether the data received on lines 246 is "location-aware" event data. Thus in the event location module 220, a process is applied to evaluate the received data.

Location-aware data is data which has coordinates in the display space of the computer system. Thus data may be identified as being associated with a location-aware event on the basis that it contains coordinate information, such as x,y coordinate information. Other techniques may exist for determining whether received data relates to a location-aware event.

If it is determined in step 102 that the data received is not related to a location-aware event, then the process moves on to step 106, and the event is sent to the operating system. In the computer system of FIG. 1, the event location module 220 therefore transmits the data on communication lines 250 to the OS interface 224. The data is then transmitted from the OS interface 224 to the OS process module 240 of the OS module 212. As denoted by step 118 in FIG. 2, the event is then processed at the operating system.

If in step 102 it is determined that the data is associated with a location-aware event, then the process moves on to step 104 and the event is sent to the application. In the computer system this is achieved by the data being transmitted on communication lines 248 from the event location module 220 to the application interface 222. The application interface 222 then transmits the data on communication lines 260 to the application module 210, and more particularly to the application window detection module 226.

As the operating system of the computer 206 is not "touch-aware", all of the data on communication line 250 is processed by the OS as mouse data.

In a step 108 a determination is then made as to whether the event is coincident with an application window of the application. Thus with reference to FIG. 1 the application window detection module 226 makes a determination as to whether the location associated with the received data is coincident with the location at which a window associated with the application is displayed on the display of the touch screen system 202. One skilled in the art will be familiar with the concept of application windows, which occupy a certain area of a display screen, which may be all or a sub-set of the display screen area.

If in step 108 it is determined that the data is not associated with a location which is coincident with an application window, then the process moves on to step 112 and the event is sent back to the driver 208. Thus referring to FIG. 1, in the computer system the application window detection module 226 sends the data on communication lines 268 to the OS interface 224 of the driver 208.

If in step 108 it is determined that the data has a location which is coincident with an application window, then the process moves on to step 110 and the data is sent for a decision to be made as to whether it is to be processed directly by the application. Thus the application window detection module 226 transmits the data on communication lines 262 to the application process decision module 228.

Step 114 is then performed in the application process decision module 228, to determine whether the operating system is required to handle the specific event associated with the data.

If a determination is made in step 114 that the operating system is required to handle the event, then the process moves to step 112, and the event is sent to the driver. This is achieved in the computer system as shown in FIG. 1 by the application process decision module 228 transmitting the data associated with the event on communication lines 266 to the OS interface 224.

If in step 114 it is determined that the operating system is not required to handle these specific events, then the process moves on to step 116 and the event is processed at the application. Thus as illustrated in FIG. 1, the application process decision module 228 transmits the data associated with the event on communication lines 264 to the application process module 230, where it is processed by the application.

If the process reverts to step 112 after step 108 or step 114, then step 106 follows, and the data associated with the event is transmitted to the operating system by the OS interface 224 on communication lines 270. Thereafter step 118 is implemented, and the event is processed at the operating system in the operating system process module 240.

An example of an event which is required to be handled at the operating system is a "drag and drop" event. Such an event may require interaction outside of the application window, even though the event is detected in the application window.

Thus the embodiment of the invention as described herein provides a mechanism in which an application is controlled by a custom data stream that contains screen location information which is coincident with a window of the application. So-called native applications, being applications native to the operating system and not a specific application such as may be associated with a touch specific application, may also be operated using the same data stream directed to the application, if they are associated with location information. The provision of the custom data stream to the application does not, however, prevent native operations which are required to be carried out by the operating system, such as drag and drop operations, being performed, as the application is adapted to detect such events and redirect them to the operating system of either driver.

Events which are required to be processed by the operating system, may include events which are provided by the mouse device 204, but directed to the application 210 in view of the location-aware nature of the event.

Thus, in summary, all location-aware events that are delivered to the application are sent from the driver to a custom application, and the custom application determines if the event "hits" one of its windows, and if so processes the event. If the event does not "hit" one of its windows, then the event is sent back to the driver from which the event originated. The driver is responsible for sending such events to the operating system, in the form of native events which the operating system does understand, for example mouse events or touch events. When an operation is initiated by the custom application which requires the operating system to be handling the event (such as the drag and drop example above) then such an event is also sent back to the driver. All non-location-aware events that are delivered to the application are sent to the OS.

In the preceding paragraph, the data is referred to as being delivered to the application, before a determination is made—in accordance with the invention—to deliver it to the application or the OS. This assumes a pre-processing step, as discussed above, for identifying data to be delivered to the OS independent of any assessment or criteria as to whether it is location-aware data.

Preferably the application receives all incoming events from the driver using a separate thread to the one responsible for taking action on them, so that events which need sending back to the driver for consumption by the operating system can continue to be sent back to the driver even if the operation being performed is blocking the application processing, such as for example a drag and drop operating being performed.

The invention is broadly applicable to any computer system adapted to receive input data, where at least some input data may be location-aware. Such input data may be provided by mouse input devices, keyboard input devices, interactive display surfaces (such as electronic whiteboards incorporating electromagnetic pen technology, camera technology, or touch sensitive technology). The invention is particularly applicable to any computer systems associated with a touch screen system, whether or not the computer system has an operating system which is "touch-aware".

Figure 3:
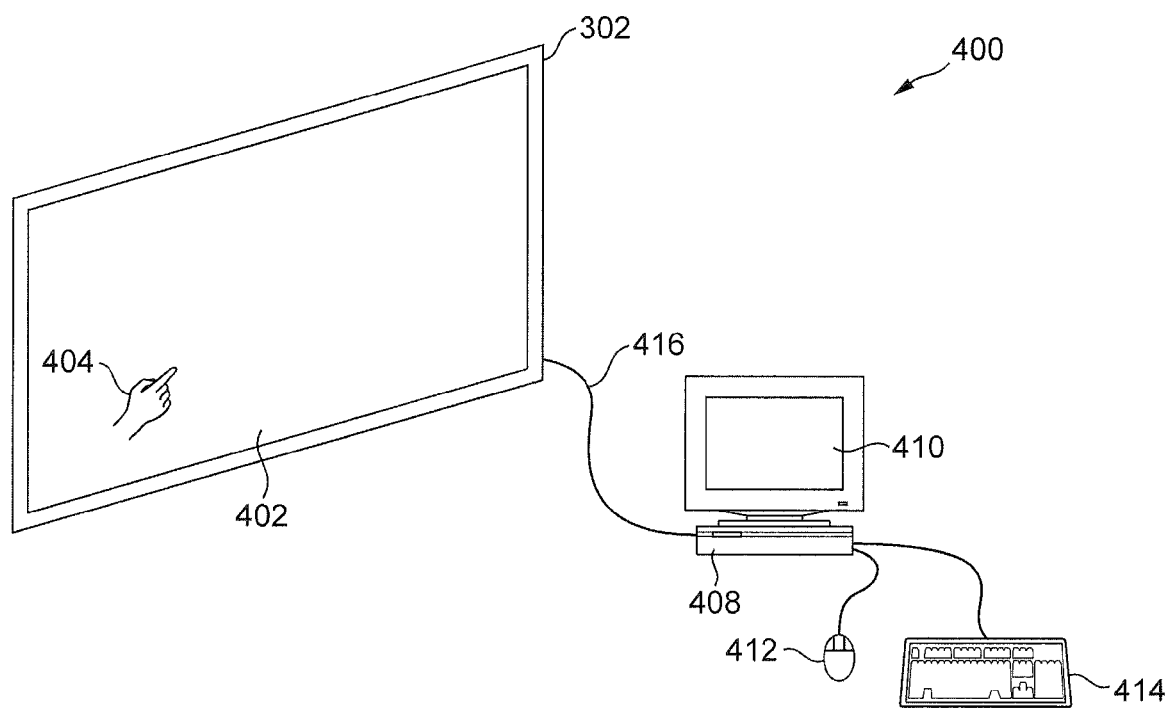
FIG. 3 illustrates an exemplary interactive display system in which the invention may be implemented.

A particularly advantageous exemplary implementation of a computer system in which the invention and its embodiments may be utilised is illustrated with respect to FIG. 3.

With respect to FIG. 3 there is illustrated an interactive display system, such as may be provided in a classroom environment for educational purposes. A touch screen system denoted by reference numeral 303 comprises a large vertical touch-sensitive display surface 402, which may be interactive with via a user's hand as denoted by reference numeral 404. A computer system 408 is connected either wirelessly or via a wired connection 416 to the touch screen system 302. The touch screen system 302 is used to display information associated with applications running on the computer system 408, and the computer system 408 is adapted to process inputs received from the touch-sensitive display surface 402 of the touch screen system 302.

The computer 408 is provided with additional input devices in FIG. 3, such as a mouse 412 and a keyboard 414. In addition the computer 408 is shown as having a display 410 associated therewith, which may display the same information as is displayed on the touch-sensitive display surface 402.

The method of the invention as described herein may be implemented in software. Computer program code associated with such software may be stored on a computer storage medium, such as a hard disk of a computer system, a disk or memory storage device which may interact with the computer system, or may be accessible via a network connection such as an internet connection.

When run on a computer system, the computer program code may cause the computer system to operate in accordance with the methods described herein with reference to the invention and its embodiments. A computer system for running software associated with such computer program code may have basic functionalities simply to support running of a program based on such computer program code, or may have additional functionality.

A computer system may also be adapted in order to provide apparatus, by way of functional modules, for implementing the invention and embodiments thereof. Functional modules of the computer system may be adapted to cause the computer system to operate in a way beyond the normal operation of the computer system, to cause the computer system to operate in accordance with the principles of the invention and its embodiments.

The invention has been described herein by way of reference to specific examples and embodiments to aid the explanation and understanding of the invention. The invention is not limited to the specifics of any embodiment given herein, and the scope of protection afforded by the invention is defined by the appended claims. The invention is not limited to any specific combination of features of an embodiment as described herein, and different embodiments described are not mutually exclusive. Individual elements of any described embodiment may be combined and separated.

What is claimed is:

1. A method for processing data received from at least one input device associated with a computer having a display, the method comprising:

in a first step, determining if received data for an event is associated with coordinates of a position in a display space of the display, and, in dependence on said data not having coordinates being associated with the position in the display space of the display, forwarding the data to be processed by an operating system of the computer; and in dependence on said data having coordinates being associated with the position in the display space, forwarding the data to be processed by an application running on the computer, in a second step, on receipt of the data at the application, determining if the coordinates of the event are coincident with the location of a displayed window associated with the application, and, in dependence on the coordinates of the event not being coincident with the application window, transmitting the data for delivery to the operating system; and in dependence on the coordinates of the event being coincident with the application window, processing the data at the application.

2. The method according to claim 1 wherein the step of processing the data at the application in dependence on the event being coincident with the application comprises:

determining if the category of event is associated with the operating system, and if so forwarding the data for processing by the operating system.

3. The method according to claim 2 wherein the step of processing the data at the application in dependence on the event being coincident with the application comprises:

determining if the category of event is not associated with the operating system, and if so performing the event at the application.

4. The method according to claim 1 wherein the application receives data associated with a position on the display space on a processing thread independent of a processing thread for performing events.

5. The method according to claim 1 wherein data associated with a position on the display space comprises input data including a position coordinate.

6. A method according to claim 1 further comprising the step, prior to determining if received data is associated with a position on the display space:

determining if received data is to be processed by the operating system, wherein the step of determining if received data is associated with a position on the display space is performed only on data which is not to be processed by the operating system.

7. A method according to claim 6 wherein the determination is made independent of whether the data is associated with a position on the display space.

8. A method according to claim 1 wherein the data received from at least one input device includes touch data.

9. A non-transitory computer program for performing, when run on a computer, the method of claim 1.

10. A non-transitory computer program product for storing computer program code, which computer program code when run on a computer performs the method of claim 1.

11. A computer system having a display and associated with at least one input device adapted for processing data received from the at least one input device, the computer system comprising:

an event location module for determining in a first step if received data is associated with a coordinate of a position on a display space of the display, and adapted to forward the data to an operating system of the computer if it is not associated with coordinates of a position on the display space, and forward the data to an application running on the computer system if it is associated with coordinates of a position on the display space;

an application window detection module for determining in a second step if an event received from the event location module has coordinates coincident with a location of a displayed window associated with the application, and further adapted to transmit the data to the operating system of the computer if it has coordinates which are not coincident.

12. The computer system of claim 11 further comprising an application process decision module, for forwarding the data to a process module of the application in dependence on the event not being associated with the operating system.

13. The computer system of claim 12 wherein the application process decision module is further adapted to forward the data to the operating system if the data is for processing by the operating system.

14. The computer system of claim 11 wherein there is provided a processing thread for the application window detection module which is independent of a processing thread for an application process module.

15. The computer system of claim 11 further comprising a pre-processing module for determining if received data is to be processed by the operating system, wherein the event-location module is arranged to receive only data which is not determined to be processed by the operating system.

16. The computer system of claim 11 wherein the at least one input device comprises at least one touch sensitive surface.

17. An interactive display system including a computer system according to claim 11.

* * * * *